United States Patent [19]

Kajikawa

[11] Patent Number: 4,950,862

[45] Date of Patent: Aug. 21, 1990

[54] LASER MACHINING APPARATUS USING FOCUSING LENS-ARRAY

[75] Inventor: Toshikazu Kajikawa, Tokyo, Japan

[73] Assignee: NEC Corporation, Japan

[21] Appl. No.: 420,599

[22] Filed: Oct. 12, 1989

[30] Foreign Application Priority Data

Oct. 12, 1988 [JP] Japan .................................. 63-254956

[51] Int. Cl.$^5$ .............................................. B23K 26/00
[52] U.S. Cl. .............................. 219/121.7; 219/121.75; 219/121.8
[58] Field of Search .................... 219/121.68, 121.69, 219/121.75, 121.78, 121.79, 121.6, 121.85

[56] References Cited

U.S. PATENT DOCUMENTS

| | | | |
|---|---|---|---|
| 3,586,816 | 6/1971 | Hagen | 219/121.63 |
| 4,378,480 | 3/1983 | Langhans | 219/121.8 X |
| 4,874,920 | 10/1989 | Yamazaki et al. | 219/121.75 X |

Primary Examiner—C. L. Albritton
Attorney, Agent, or Firm—Ostrolenk, Faber, Gerb & Soffen

[57] ABSTRACT

A laser beam machining apparatus for finely machining a semiconductor circuit or similar workpiece on a stage including a scanning mirror for directing the beam, scanning lens for converting the beam to a beam substantially perpendicular to the workpiece, lens array unit and mask for focusing the beam, driving means for X-Y movement of the lens array unit and control means for controlling the mirror driving means and stage.

10 Claims, 6 Drawing Sheets

LASER MACHINING APPARATUS USING FOCUSING LENS-ARRAY

BACKGROUND OF THE INVENTION

The present invention relates to an improvement in a laser machining apparatus for finely machining a semiconductor circuit or similar workpiece by focusing a laser beam thereonto.

A laser machining apparatus of the type described generally focuses a laser beam to a machining position by either one of two different laser positioning systems. One of the positioning systems uses a mirror which is rotatably driven by a galvanometer and steers an incident laser beam, and an f$\theta$ lens which focuses the steered laser beam onto a workpiece. The other system shifts an XY stage or table loaded with a workpiece while maintaining a laser beam fixed in position, until a predetermined machining position coincides with the focusing position of the laser beam, as disclosed in U.S. Pat. No. 4,543,464.

The beam steering scheme mentioned above features an inherently high beam scanning rate. However, it has a drawback that the laser beam cannot be positioned with accuracy relative to a workpiece. Another drawback is that the beam spot cannot be reduced in radius while keeping the same scanning area because the focal length of the f$\theta$ lens has to be reduced for the decreased beam spot. While the stationary beam scheme is successful in determining an accurate machining position, it results in a bulky and expensive apparatus construction due to the need for a precision XY stage which is movable over a substantial distance and slow in movement.

A beam positioning system which constitutes an improvement over the above-discussed two systems is disclosed in U.S. Pat. No. 4,532,402. Specifically, the improvement uses an XY stage which is made up of an X stage and a Y stage and loaded with a workpiece. A galvanometer and a focusing lens are rigidly mounted on one of the X and Y stages for steering a laser beam. The XY stage roughly adjusts the position of the laser beam over a broad area, while a mirror mounted on the galvanometer steers the laser beam at a high speed over a small area around a desired machining position. This kind of approach, however, requires the XY stage to move over a broad area and requires a substantial period of time for moving the XY stage, while increasing the overall dimensions of the assembly. Since the final positioning of the laser beam is effected by the galvanometer, the accuracy of machining position is not satisfactory. Further, complicated control is needed for the XY stage and galvanometer.

SUMMARY OF THE INVENTION

It is therefore an object of the present invention to provide a laser machining apparatus which locates a laser beam at a desired machining position rapidly and, yet, with accuracy.

In accordance with the present invention, a laser machining apparatus for machining a workpiece by focusing a laser beam to a desired position on a surface of the workpiece comprises a laser beam source for emitting the laser beam, a scanner for steering the laser beam from the laser beam source in a first direction, a scanning lens for converting the laser beam steered by the scanner into a beam which is substantially perpendicular to the surface of the workpiece, a lens array unit having a plurality of miniature focusing lenses which are arranged in an array in the first direction for focusing a part of the laser beam from the scanning lens to the desired position, a stage movable in a second direction perpendicular to the first direction while being loaded with the workpiece, a first driver for moving the lens array unit in the first direction by a small amount, a second driver for driving the stage, and a controller for controlling the scanner, first driver, and second driver. The controller controls the scanner such that the optical axis of the laser beam incident to the lens array unit is located in close proximity to the desired position on the workpiece. The controller controls the first driver such that the optical axis of one of the focusing lenses of the lens array unit coincides with the desired machining position. Further, the controller controls the second driver such that the stage is positioned in the second direction.

Also, in accordance with the present invention, a laser machining apparatus for machining a desired position on a surface of a workpiece by focusing a laser beam to the desired position comprises a laser beam source for emitting the laser beam, a scanner for steering the laser beam from the laser beam source in a first and a second directions which are perpendicular to each other, a scanning lens for converting the laser beam steered by the scanner into a beam which is substantially perpendicular to the surface of the workpiece, a lens array unit having a plurality of miniature focusing lenses which are arranged in a two-dimensional array in the first and second directions for focusing a part of the laser beam from the scanning lens to the desired position, a stationary stage loaded with the workpiece, a driver for moving the lens array unit in the first and second directions by a small amount, and a controller for controlling the scanner and driving means. The controller controls the scanner such that the optical axis of the laser beam incident to the lens array unit is directed in close proximity to the desired position on the workpiece. Further, the controller controls the driver such that the optical axis of one of the focusing lenses of the lens array unit coincides with the desired machining position.

BRIEF DESCRIPTION OF THE DRAWINGS

The present invention will be better understood from the following detailed description taken in conjunction with the accompanying drawings in which.

DETAILED DESCRIPTION OF THE PREFERRED EMBODIMENTS

Figure 1:
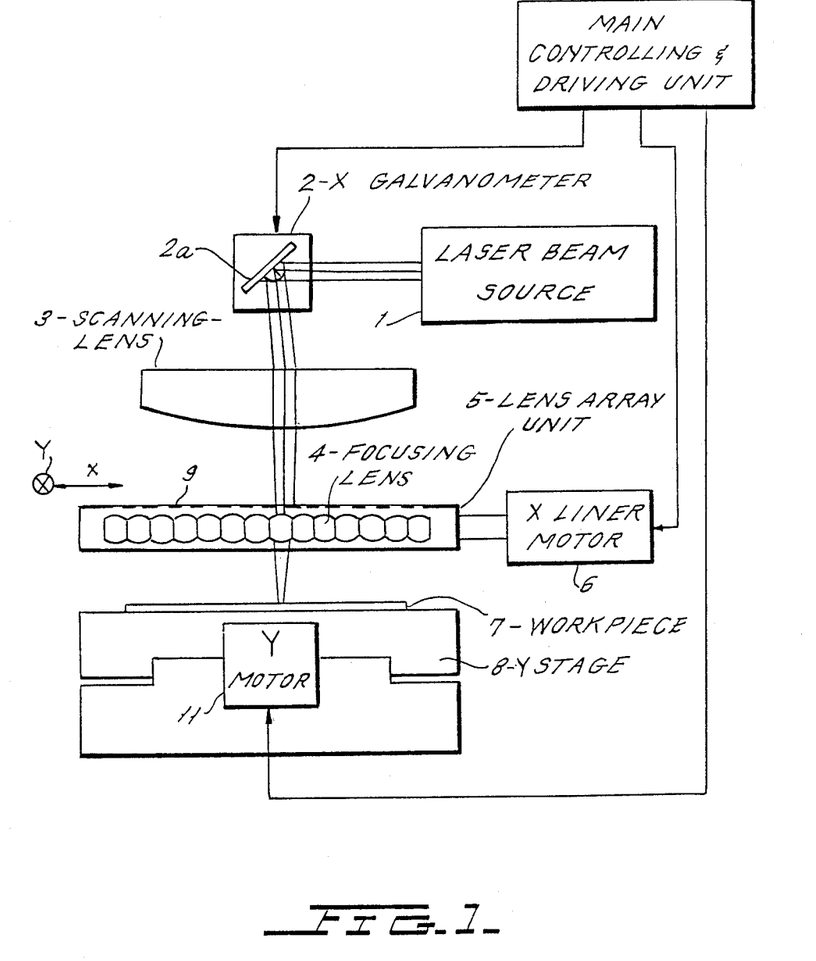
FIG. 1 is a schematic block diagram showing electrical and mechanical arrangements of a laser machining apparatus embodying the present invention.

Referring to FIG. 1 of the drawings, a laser machining apparatus embodying the present invention comprises a laser beam source 1, an X galvanometer 2, scanning lens 3, and lens array unit 5. The laser beam source 1 emits a parallel laser beam having a uniform intensity distribution as measured on a plane perpendicular to the optical axis. The X galvanometer 2 steers the laser beam in the X direction by rotating a mirror 2a which is mounted thereon. The scanning lens implemented as an f$\theta$ lens 3 transforms the beam from the mirror 2a into a beam which is perpendicular to the surface of a workpiece 7. A lens array unit 5 has a plurality of miniature focusing lenses 4 arranged one-dimensionally in the X direction and focuses a part of the laser beam from the lens 3 onto the workpiece 7. There are also shown in the figure an X linear motor 6, a Y stage 8 which is loaded with the workpiece 7, a Y motor 11 for driving the Y stage 8 in a Y direction which is perpendicular to the X direction, and a main controlling and driving unit 10 for controllably driving the X galvanometer 2 and the motors 6 and 11.

The laser beam emitted from the laser beam source 1 is reflected by the mirror 2a mounted on the galvanometer 2 to become incident to the scanning lens 3. Specifically, the beam is incident to a position on the reflecting surface of the mirror 2a which is on an extention of a rotation axis of the mirror and which is also a focal point of the scanning lens 3. Hence, while the mirror 2a is rotated about the axis which extends perpendicular to the sheet surface of FIG. 1, the beam steered thereby in the X direction is transformed by the lens 3 into a beam which is perpendicular to an X-Y plane. The lens array unit 5 which will be described in detail focuses a part of the beam coming out of the lens 3 onto the workpiece 7 in the form of a small beam spot.

Figure 4:
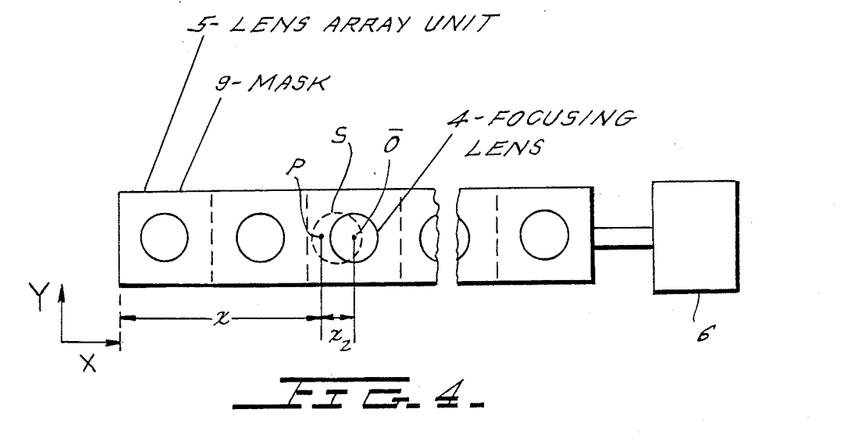
FIG. 4 is a plan view of a lens array unit and an X linear motor included in the illustrative embodiment.

Assume that the workpiece 7 is an IC (Integrated Circuit) wafer which is dimensioned 8 inches at maximum. Then, the scanning range in the X-direction defined by the galvanometer 2 and scanning lens 3 is about 200 millimeters and, hence, the lens 3 needs to have a long focal length. On the other hand, each miniature focusing lens 4 has a focal length as short as possible in order to provide a small beam spot. If desired, the miniature lenses 4 may each be constituted by a GRIN (gradient index materials) lens having a generally parabolic refractive index distribution whose index of refraction is greatest on the optical axis and gradually decreases with the square of the distance from the optical axis. As shown in FIG. 4, the miniature lenses 4 are arranged in an array at the same distance $l_x$, while a mask 9 screens the end surfaces of the lenses 4 except for their portions around the optical axes. The individual lenses 4 are arranged parallel with each other in their optical axes, and have the same physical properties and dimensions. Specifically, they have substantially the same length and refractive index distribution. The unit lens array 5 is disposed so that the laser beam from the scan lens strikes the end surfaces of the lenses 4 perpendicularly. In this configuration, only a part of the laser beam from the lens 3 which is incident to one of the lenses 4 is focused onto the workpiece 7 to form a beam spot. The position of the beam spot on the workpiece 7 is adjustable by moving the optical axis of the lens 4 in the X direction because the laser beam incident to the lens 4 is focused on the optical axis of the lens.

To move the beam spot on the workpiece 7 in the X direction, the main controlling and driving unit 10 controls the galvanometer 2 to rotate the mirror 2a and thereby to shift the laser beam at high speed to the vicinity of a predetermined machining position P (FIG. 4). At the same time, the unit 10 controls the linear motor 6 to move the lens array unit 5 finely in the X direction until an optical axis $\overline{O}$ of a particular focusing lens 4 which is located the closeset to the machining position P reaches the position P. As a result, a part of the laser beam incident to the lens array unit 5 is focused to the machining position by the lens 4 with accuracy. In this instance, the lens array unit 5 has only to be moved by the distance between nearby miniature lenses 4. Specifically, assuming that the distance between the lenses 4 is 1 millimeter, then the required distance of movement is not more than about 1 millimeter at maximum, enhancing rapid movement of the lens 4. This, coupled with the fact that the galvanometer 2 steers the laser beam at high speed, promotes rapid positioning of the laser beam in the X direction and rapid positioning of the beam spot. The beam spot is manipulated in the Y direction by the Y stage 8 which is loaded with the workpiece 7.

Figure 2:
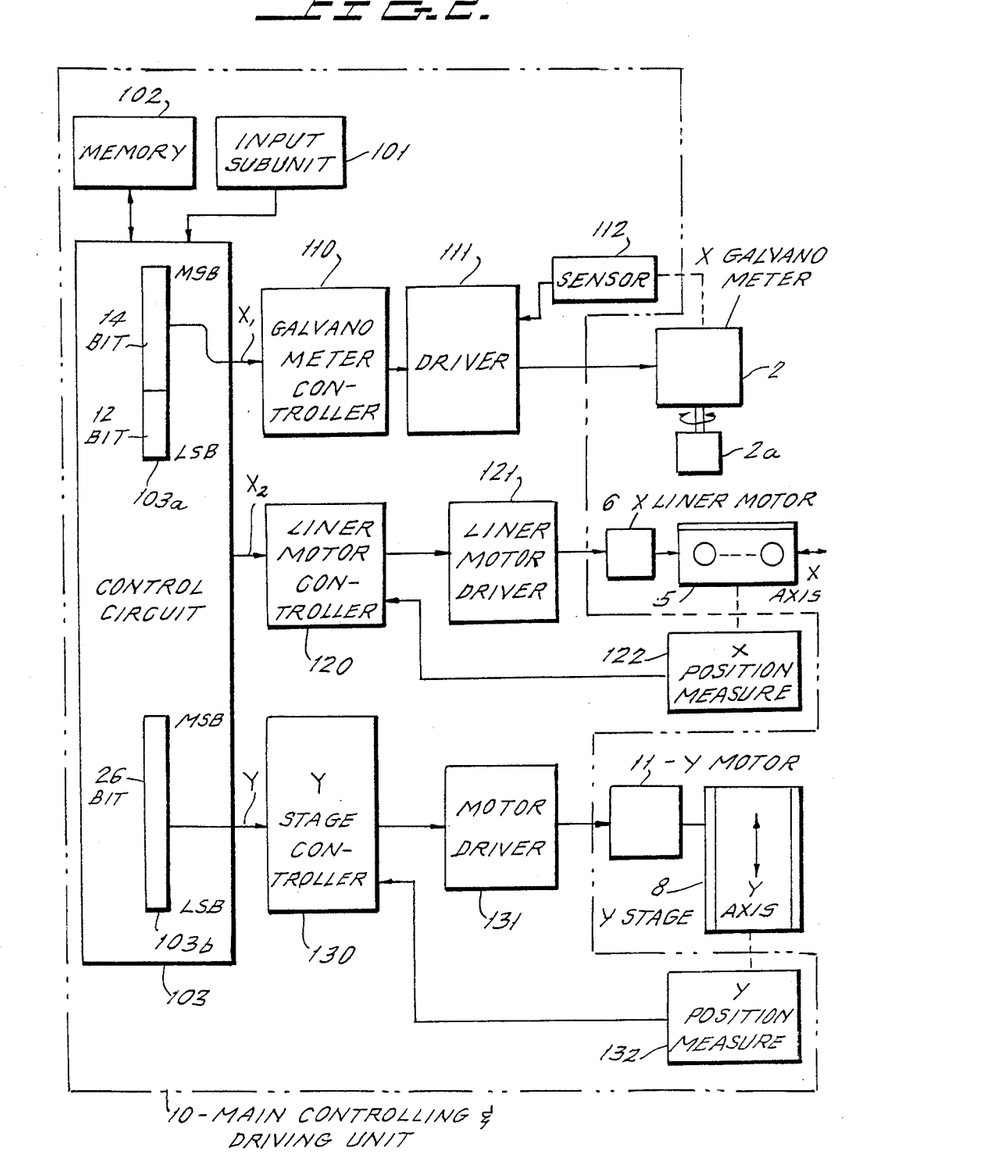
FIG. 2 is a schematic block diagram showing a specific construction of a main controlling and driving unit of the laser machining apparatus shown in FIG. 1 together with components associated therewith.

Referring to FIG. 2, the main controlling and driving unit 10 includes an inputting subunit 101 for entering X and Y coordinates data representative of a particular laser machining position of the workpiece 7 in the X and Y directions beforehand, a memory 102, and a control circuit 103. The memory 102 is loaded with the entered X and Y coordinates data. A control circuit 103 controls the unit 10 on the basis of the data stored in the memory 102. A galvanometer controller 110 controls a driver 111 for driving the galvanometer 2, in response to the X coordinate data. A linear motor controller 120 controls a driver 121 for driving the X linear motor 6, also in response to the X coordinate data. A Y stage controller 130 controls a motor driver 131 which drives the Y motor 11, in response to the Y coordinate data.

In the illustrative embodiment, assume that the machining ranges of the workpiece 7 as measured in the X and Y directions are 200 millimeters each, and that the resolution of the focusing position in the X and Y directions is 0.01 micron ($\mu$m). Then, the data length of X and Y coordinates data to be stored in the memory 102 has to be 25 bits at minimum. In FIG. 2, the 26-bit X and Y coordinates data are stored in the memory 102.

Figure 3:
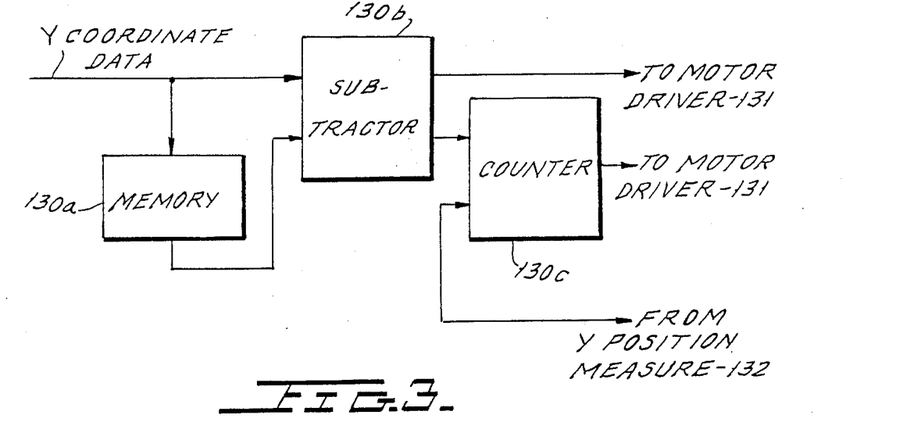
FIG. 3 is a block diagram schematically showing a Y stage controller included in the main controlling and driving unit shown in FIG. 2.

The positioning with the Y stage 8 is implemented by an ordinary stage positioning method. Specifically, the 26-bit Y coordinate data stored in the memory 102 is transferred to the Y-stage controller 130 via a Y register 103b which is built in the control circuit 103. As shown in FIG. 3, the Y stage controller 130 has a subtractor 130b for effecting subtraction with the Y coordinates data fed from the Y register 103b and the Y coordinate data representative of the previous position (data stored in the memory 130a), and a counter 130c in which the absolute value of the resulting difference is preset. The subtractor 130b determines a direction and a distance by which the Y stage 8 has to be moved relative to the current position. The absolute value of the resulting difference shows the distance, while the sign (positive or negative) of the same indicates the direction. When a signal representative of the sign of the difference is fed from the subtractor 130b to the motor driver 131, a direction for moving the Y stage 8 is determined. A Y position measuring instrument 132 (commercially available laser interferometer) is responsive to the movement of the Y stage 8 and generates one pulse every time the latter moves 0.01 micron. The counter 130c of the Y stage controller 130 counts the output pulses of the instrument 132 and, on counting a preset number of pulses, stops its operation. While the counter 130c is in operation, the motor driver 131 drives the Y motor 11 to thereby move the Y stage 8 in the Y direction. As soon as the counter 130 counts up the present number of pulses and thereby changes its output, the motor driver 131 stops driving the Y motor 11 immediately.

As stated above, the Y stage 8 is shifted to a particular position represented by the Y coordinate data while being measured by the instrument 132 on a 0.01 micron basis.

The drive and control over the X galvanometer 2 and X linear motor 6 will be described in detail with reference to FIGS. 1 and 2. The X galvanometer 2 positions the laser beam through the scanning lens (usually f$\theta$ lens) 3, as previously stated. Assuming that the focal length of the lens 3 is f, and the length of the lous of the beam on the lens 3 is $x_\theta$ when the rotation angle of the mirror 2a mounted on the galvanometer 2 is $\theta$, then there holds a relationship:

$$x_\theta = 2f\theta \tag{1}$$

Hence, the resolution $\Delta x_\theta$ of the beam position relative to the resolution $\Delta \theta$ the rotation angle of the mirror 2a is expressed as:

$$\Delta x_\theta = 2f\Delta\theta \tag{2}$$

In order to position that laser beam over a broad area by a galvanometer whose rotation angle is limited, a lens is provided with a large focal length f. Then, the resolution $\Delta x_\theta$ of the beam position will increase and thereby eliminate the need for coordinate data associated with high resolution in effecting the positioning control over the galvanometer.

In FIG. 2, among the 26 bits of X coordinate data transferred from the memory 102 to the X register 103a of the controller 103, upper 14 bits are used as position coordinate data $X_1$ for controlling the X galvanometer 2. In this instance, resolution regarding the position in the X direction is 40.96 microns. Specifically, every time the data $X_1$ changes by one (LSB), the galvanometer 2 shifts the laser beam 40.96 microns in the X direction; as the data $X_1$ reaches the minimum or maximum value, the galvanometer 2 substantially locates the laser beam at either one of opposite ends of the X direction scanning area. On receiving data $X_1$, the galvanometer controller 110 converts it into an analog signal associated with the rotation angle of the mirror 2a. This analog signal corresponds to a voltage which a rotation angle sensor 112 generates to indicate a rotation angle of the mirror 2a. The driver 111 generates a drive current proportional to a difference between the analog signal from the controller 110 and the output voltage of the rotation angle sensor 112, the drive current being applied to the galvanometer 2. In response, the galvanometer 2 rotates the mirror 2a. When the actual rotation angle of the mirror 2a equals the angle indicated by the data $X_1$, the drive current from the driver 111 becomes zero to stop the rotation of the mirror 2a. In this manner, beam positioning by the galvanometer 2 is finished.

In the illustrative embodiment, the beam positioning resolution available with the X galvanometer 2 is 40.96 microns, as previously stated. Further accurate positioning is, therefore, achieved by the linear motor 6 which drives the lens array unit 5. How the lens array unit 5 is positioned will be described with reference to FIGS. 2 and 4.

In FIG. 4, the center axis of the laser beam S from the scanning lens 3 is located in the vicinity of the position P (within the range of 40.96 microns as measured from the position P). A dashed circle represents the boundary of the illuminating area of the laser beam S coming out of the scanning lens 3. In the condition shown in FIG. 4, a part of the laser beam is incident to the miniature lens 4 which is located at the right of the position P, i.e., it is focused on the optical axis $\overline{O}$ of that lens 4. The lens array unit 5, therefore, has to be shifted by a distance $x_2$ to the left so that the optical axis $\overline{O}$ may coincide with the position P. Assuming that the X coordinate of the position P is $x_2$, then it is produced by:

$$x_2 = \text{MOD}(x, l_x) - e_x/2 \tag{3}$$

where MOD $(x, l_x)$ is a residual produced by dividing the coordinate x by the distance $l_x$.

The distance $x_2$ lies between $-l_x/2$ and $+l_x/2$, and it is positive when the target position P is located at the right of the optical axis $\overline{O}$ of the lens 4 and is negative when the latter is located at the left. Since the laser beam can be accurately positioned only if the linear motor 6 shifts the lens array unit 5 by $x_2$, the shifting range is only $-l_x/2$ to $+l_x/2$.

In FIG. 2, the control circuit 103 calculates the equation (3) on the basis of the 26-bit X coordinate data having been stored in the memory 102. The resulting 26-bit data $X_2$ representative of a distance $x_2$ is fet to a linear motor controller 120. Let the data $l_x$ be assumed to be stored in the memory 102 beforehand. An X position measuring instrument 122, like the Y position measuring instrument 132, generates one pulse every time the lens array unit 5 is moved by 0.01 micron and feeds it to the linear motor controller 120.

The linear motor controller 120 counts the output pulses of the instrument 122, drives the driver 121 until the count equals the absolute value of the data $X_2$, and indicates the driver 121 a direction for moving the lens array unit 5 on the basis of the sign of the data $X_2$. Hence, as the optical axis $\overline{O}$ of the lens shown in FIG. 4 approaches the target position P until the number of output pulses equals the data $X_2$, the linear motor controller 120 commands the driver 121 the stop of drive of the linear motor 6. If desired, the linear motor 120 may use, in place of the data $X_2$, data $X_3$ produced by adding to the data $X_2$ a correction value E(X) derived from positional errors which are dependent upon the optics. The positional errors mentioned mainly comes from the ununiformity in the focal length, interval and other factors of the lenses 4 of the lens array unit 5, and the insufficient accuracy of the X galvanometer 2 (deviation of incidence angle and movement relative to the lens array unit 5). Various approaches are available for sensing such positional errors. One possible approach is to place a reference pattern on the Y stage 8, emit and focus a laser beam onto the reference pattern to sense a reflection (diffracted light), and then produce a correction value E(X). An alternative is to directly machine a test substrate, measure the position of the machined spot, and then produce a correction value E(X). The correction value E(X) is stored in the linear motor controller 120 and added to input data $X_2$ to produce the data $X_3$.

Figure 5:
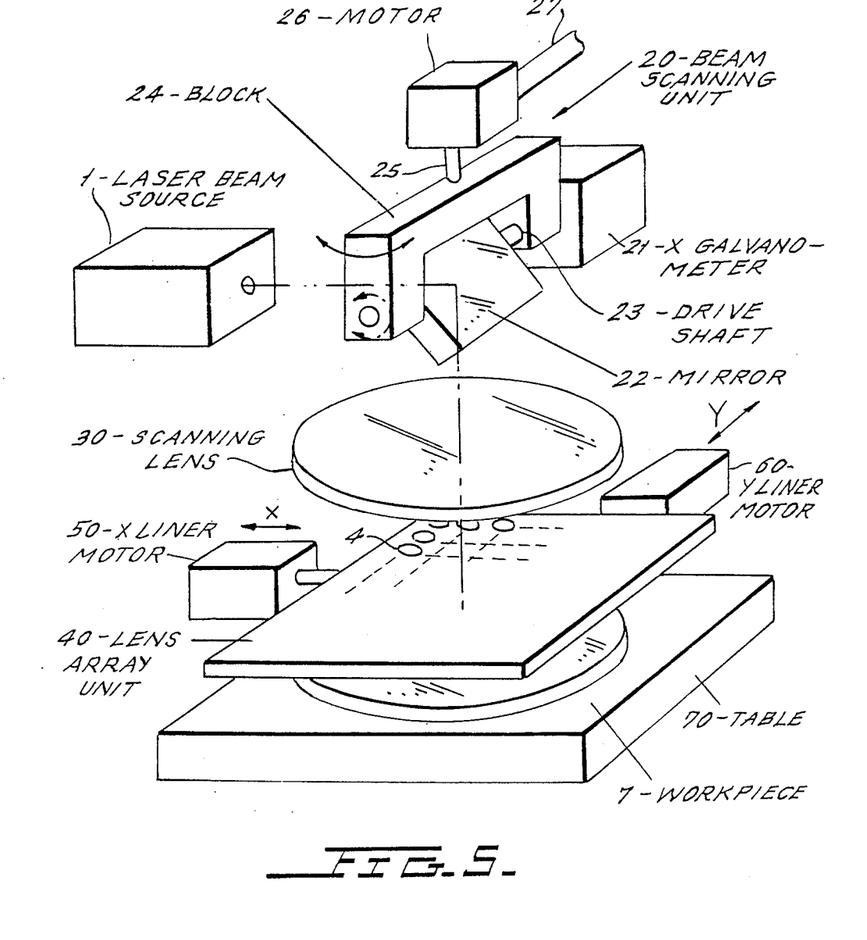
FIG. 5 is a schematic block diagram representative of an alternative embodiment of the present invention.

Referring to FIG. 5, an alternative embodiment of the present invention is shown. The alternative embodiment comprises the laser beam source 1, a beam scanning unit 20 for steering a laser beam from the laser beam source 1 in the X and Y directions, a scanning lens 30 for converting the steered laser beam into a beam which is perpendicular to the surface of the workpiece 7, a lens array unit 40 comprised of a plurality of miniature focusing lenses 4 arranged in the X and Y directions, an X linear motor 50 and a Y linear motor 60 for moving the unit 40 in the X and Y directions, respectively, and a stationary table 70 to be loaded with the workpiece 7.

While the apparatus shown in FIG. 1 controls the position in the Y direction by moving the Y stage 8 loaded with the workpiece 7, the apparatus of FIG. 5 holds the workpiece 7 stationary and controls the position in the X and Y directions by causing the beam scanning unit 20 to manipulate the laser beam in the X and Y directions and by finely adjusting the beam focusing position which is determined by the X linear motor 50 and the Y linear motor 60.

The beam scanning unit 20 has an X galvanometer 21, a mirror 22 rigidly mounted on a drive shaft 23 of the galvanometer 21 and rotated thereby for steering the laser beam in the X direction, a block 24 rotatably mounted on the shaft 23, and a motor 26 for rotating the block 24 about a vertically extending shaft 25. The motor 26 is mounted on a support 27 of the apparatus and rotates the block 24 about the shaft 25, so that the mirror 22 (and galvanometer 21) is also rotated about the shaft 25 to manipulate the laser beam in the Y direction. The laser beam is incident to the reflecting surface of the mirror 22 at the center of rotation of the latter which is coincident with the focal point of the scanning lens 30. The scanning lens 30 is implemented as an $f\theta$ lens and, hence, the laser beam manipulated in the X and Y directions by the mirror 22 will be incident to the lens array unit 40 perpendicularly to the X and Y axes.

Figure 6:
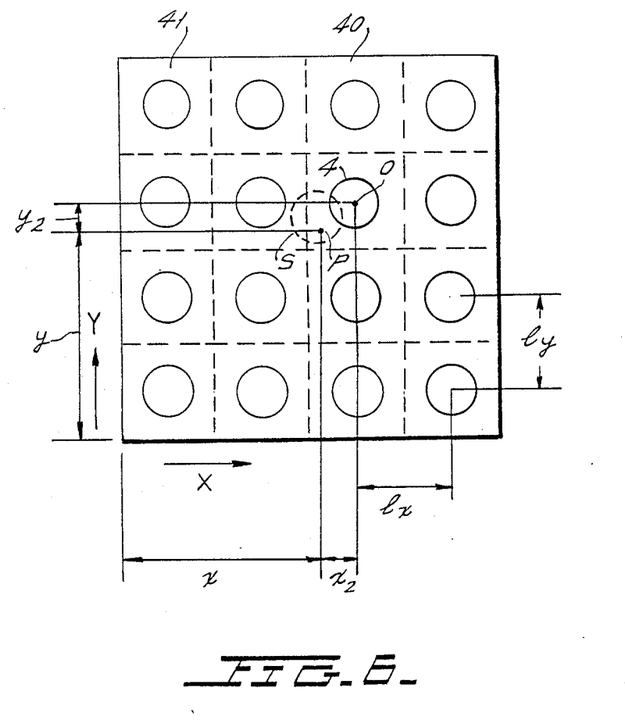
FIG. 6 is a plan view of a lens array unit included in the embodiment shown in FIG. 5.

As shown in FIG. 6, the focusing lenses 4 of the lens array unit 40 are arranged regularly in the X and Y directions at equal distances, i.e., a distance $l_x$ in the X direction and at a distance $l_y$ in the Y direction. In this particular embodiment, the distances $l_x$ and $l_y$ are equal to each other. A mask 41 screens the lens array unit 40 except for the portions around the optical axes of the individual lenses 4. Sixteen lenses 4 are shown in FIG. 6 by way of example.

Figure 7:
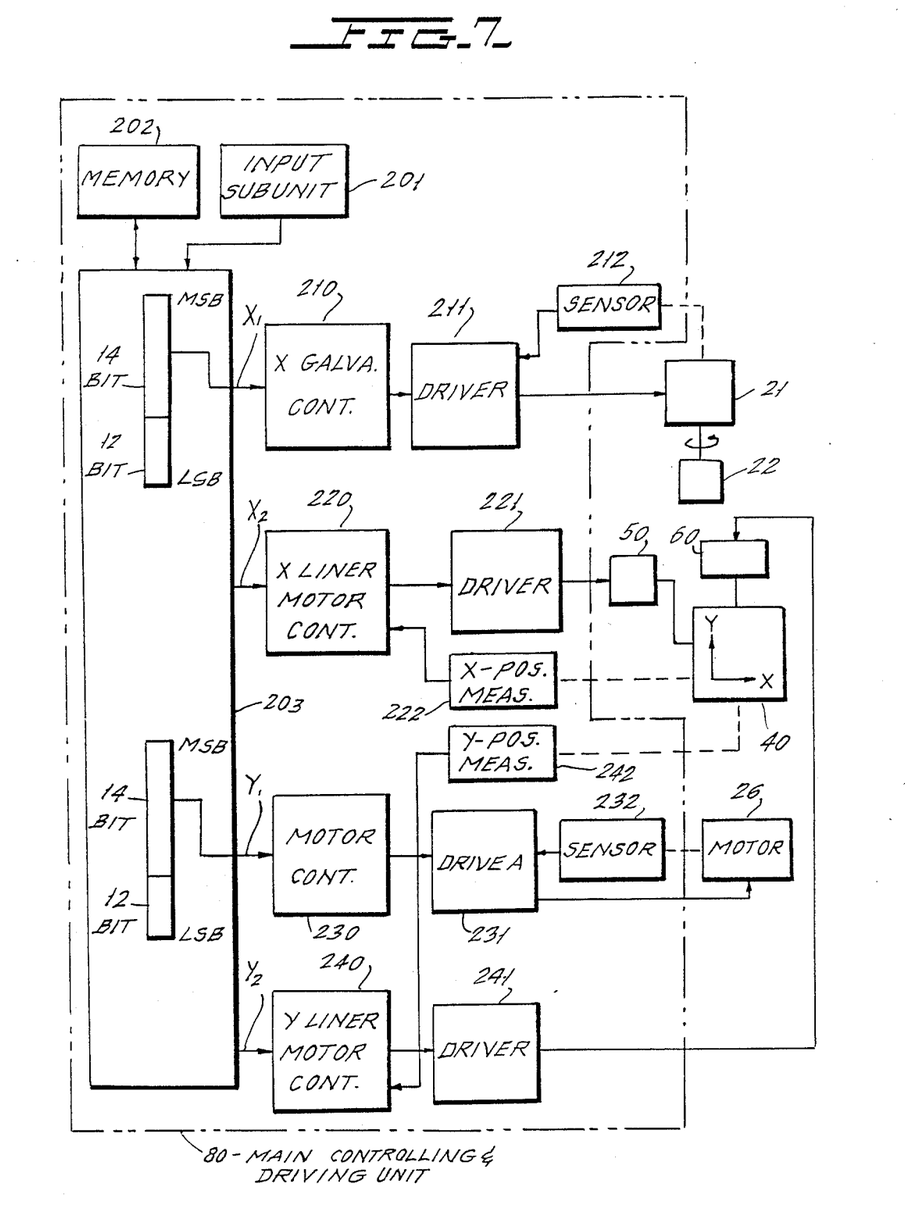
FIG. 7 is a schematic block diagram showing a main controlling and driving unit for electrically controlling the embodiment of FIG. 5, together with components associated therewith.

The X linear motor 50 and Y linear motor 60 for moving the lens array unit 40 and the X galvanometer 21 and motor 26 for manipulating the laser beam are controlled by a main controlling and driving unit 80 (FIG. 7). The positioning in the X direction on the workpiece 7 as effected by the X galvanometer 21 and X linear motor 26 is the same as the positioning effected by the X galvanometer 2 and X linear motor 6 of FIG. 1. The positioning in the Y direction on the workpiece 7 is implemented by the motor 26 and Y linear motor 60 in the same manner as the positioning in the X direction. Assume that the machining range is 200 millimeters both in the X direction and in the Y direction, the positioning resolution determined by the controllable drive of the galvanometer 21 and motor 26 is 40.96 microns, and the positioning resolution determined by the X and Y linear motors 50 and 60 is 0.01 micron, as with the first embodiment. Then, the center axis of the laser beam is controlled by the galvanometer 21 and motor 26 to a range of 40.96 microns as measured from a target position on the workpiece 7. It is further located at the target position with accuracy of 0.01 micron by the controllable drive of the X and Y linear motors 50 and 60.

As shown in FIG. 6, when the optical axis $\overline{O}$ of the focusing lens 4 of the lens array unit 40 is not aligned with the target position P on the workpiece 7, the laser beam S from the scanning lens 30 is focused to the optical axis $\overline{O}$ of the lens and not to the position P. In order to focus the laser beam S to the position P, the optical axis $\overline{O}$ of the lens 4 is shifted by $x_2$ and $y_2$ in the directions X and Y, respectively, to the position P. While the distance $x_2$ is produced by the equation (3) as indicated previously, the distance $y_2$ is given by:

$$y_2 = \text{MOD}(y, l_y) - l_y/2 \tag{4}$$

where y and MOD $(y, l_y)$ are respectively the Y coordinate of the position P and the residual produced by dividing y by $l_y$. The unit 80 drives the motors 50 and 60 in response to $x_2$ and $y_2$ derived from the equations (3) and (4) so as to bring the optical axis $\overline{O}$ of the lens 4 into coincidence with the position P.

Referring to FIG. 7, the main controlling and driving unit 80 comprises an inputting subunit 201 accessible for entering X and Y coordinates data representative of the machining position (P, FIG. 6) of the workpiece 7 beforehand, a memory 202, and a control circuit 203. The memory 202 stores the entered X and Y coordinates data. The control circuit 203 controls the unit 80 on the basis of the stored coordinates data. The X and Y coordinates data are each represented by 26 bits, as in the apparatus of FIG. 1. Upper 14 bits of the X and Y coordinates data are adapted to drive and control the X galvanometer 21 and motor 26. In the unit 80, an X galvanometer controller 210, a driver 211, a rotation angle sensor 212, an X linear motor controller 220, a motor driver 221 and an X position measuring instrument 222 are the same as the galvanometer controller 110, driver 111, rotation angle sensor 112 linear motor controller 120, linear motor driver 121, and X position measuring instrument 122 which are shown in FIG. 2. Specifically, the X galvanometer controller 210 and driver 211 control the galvanometer 21 on the basis of data $X_1$ constituted by upper 14 bits of X coordinate data which is stored in the memory 202. The X linear motor controller 220 and linear motor driver 221 control the X linear motor 50 on the basis of data $X_2$ which corresponds to $x_2$ produced by the equation (3).

The motor controller 230 and motor driver 231 drive the motor 26 in response to data $Y_1$, which is upper 14 bits of Y coordinate data, in the same manner as the controllable driver over the X galvanometer 21. More specifically, the motor controller 230 transforms data $Y_1$ into an analog signal associated with the rotation angle of the shaft 25 of the motor 26, while the motor driver 231 feeds to the motor 26 a drive current proportional to a difference between the analog signal from the motor controller 230 and the voltage from the rotation angle sensor 232 which is representative of the rotation angle of the shaft 25. The motor 26 rotates the block 24 about the shaft 25 in response to the drive current. When the block 24 is rotated by an angle associated with the data $Y_1$, the drive current from the driver 231 becomes zero to stop the rotation of the motor 26. The motor 26 positions the optical axis of the laser beam from the laser beam source 1 within the range of 40.96 microns as measured from the target position P, while the Y linear motor 60 positions it with further accuracy by finely shifting the lens array unit 40 in the Y direction.

More specifically, the control unit 203 calculates the equation (4) on the basis of the 26-bit Y coordinate data stored in the memory 202 and thereby delivers 26-bit data $Y_2$ representative of a distance $y_2$ to the Y linear motor controller 240. It is assumed that the data $l_y$ is stored in the memory 202 beforehand. A Y position measuring instrument 242, like the X position measuring instrument 222, generates one pulse every time the lens array unit 40 moves 0.01 micron and feeds it to the Y linear motor controller 240. The Y linear motor controller 240 counts the output pulses of the instrument 242, drives the driver 241 until the count equals the absolute value of the data $Y_2$, and indicates the driver 241 a direction for moving the lens array unit 40 on the basis of the sign of the data $Y_2$. Therefore, as the optical axis $\overline{O}$ of the lens 4 shown in FIG. 6 approaches the target position P until the count of the pulses equals the data $Y_2$, the linear motor controller 240 commands the driver 241 the stop of operation of the linear drive 241. Again, the linear motor controller 240 may use, in place of the data $Y_2$, a correction data which is the sum of the data $Y_2$ and a correction value E(Y) associated with positional errors dependent upon optics.

While the lens array units 5 and 40 have each been shown and described as being driven by a linear motor, they may of course be driven by any other suitable kind of motor. The miniature focusing lenses of the lens array unit may be replaced with Fresnel lenses, if desired. In the apparatus shown in FIG. 5, the laser beam from the laser beam source 1 is scanned by a single mirror 22 in the X and Y directions. Alternatively, it may be steered in the X and Y directions by independent mirrors which are driven by exclusive galvanometers.

In summary, it will be seen that the present invention provides a laser machining apparatus which realizes rapid and accurate laser spot scanning, i.e., implements high speed by using a mirror which is rotated by a galvanometer, for example, and accuracy by moving a laser spot by a distance which is not longer than the distance between nearby lenses of a focusing lens array. Further, the present invention eliminates the need for a large X and Y stage assembly for positioning a broad area.

What is claimed is:

1. A laser machining apparatus for machining a workpiece by focusing a laser beam to a desired position on a surface of said workpiece, comprising:
   a laser beam source for emitting the laser beam;
   scanning means for steering the laser beam from said laser beam source in a first direction;
   scanning lens means for converting the laser beam steered by said scanning means into a beam which is substantially perpendicular to the surface of the workpiece;
   a lens array unit having a plurality of miniature focusing lenses which are arranged in an array in the first direction for focusing a part of the laser beam from said scanning lens means to the desired position;
   a stage movable in a second direction perpendicular to the first direction while being loaded with the workpiece;
   first driving means for moving said lens array unit in the first direction by a small amount;
   second driving means for driving said stage; and
   control means for controlling said scanning means, said first driving means, and said second driving means;
   said control means controlling said scanning means such that an optical axis of the laser beam incident to said lens array unit is located in close proximity to the desired position on the workpiece;
   said control means controlling said first driving means such that an optical axis of one of said focusing lenses of said lens array unit coincides with the desired position;
   said control means controlling said second driving means such that said stage is positioned in the second direction.

2. An apparatus as claimed in claim 1, wherein said scanning means comprises a mirror for reflecting the laser beam from said laser beam source, said mirror being rotatable to steer the reflected laser beam in the first axis direction.

3. An apparatus as claimed in claim 2, wherein said scanning lens means comprises an $f\theta$ lens a focus of which is coincident with a point on said mirror where the laser beam from said laser beam source is incident, said point being coincident with a center of rotation of a reflecting surface of said mirror.

4. An apparatus as claimed in claim 1, further comprising a mask which screens a surface of said lens array unit to which the laser beam is incident, said mask being open at and around optical axes of said miniature focusing lenses.

5. An apparatus as claimed in claim 1, wherein said control means comprises:
   means for generating first axis data and second axis data respectively representative of a position of the desired position on the workpiece in the first direction and a position of said desired position in the second direction;
   means for controlling said scanning means in response to the first axis data;
   means for controlling said first driving means in response to the first axis data; and
   means for controlling said second driving means in response to the second axis data.

6. A laser machining apparatus for machining a desired position on a surface of a workpiece by focusing a laser beam to said desired position, comprising:
   a laser beam source for emitting the laser beam;
   scanning means for steering the laser beam from said laser beam source in a first direction and a second direction perpendicular to said first direction;
   scanning lens means for converting the laser beam steered by said scanning means into a beam which is substantially perpendicular to the surface of the workpiece;
   a lens array unit having a plurality of miniature focusing lenses which are arranged in a two-dimensional array in the first direction and the second direction for focusing a part of the laser beam from said scanning lens means to the desired position;
   a stationary stage loaded with the workpiece;
   driving means for moving said lens array unit in the first direction and the second direction by a small amount; and
   control means for controlling said scanning means and said driving means;
   said control means controlling said scanning means such that an optical axis of the laser beam incident to said lens array unit is located in close proximity to the desired position on the workpiece;

said control means controlling said driving means such that an optical axis of one of said focusing lenses of said lens array unit coincides with the desired position.

7. An apparatus as claimed in claim 6, wherein said scanning means comprises at least one mirror for reflecting the laser beam from said laser beam source, said mirror being rotatable to steer the reflected laser beam in the first direction and the second direction.

8. An apparatus as claimed in claim 7, wherein said scanning lens comprises an f$\theta$ lens a focus of which is coincident with a point on said mirror where the laser beam from said laser beam source is incident, said point being coincident with a center of rotation of a reflecting surface of said mirror.

9. An apparatus as claimed in claim 6, further comprising a mask which screens a surface of said lens array unit to which the laser beam is incident, said mask being open at and around optical axis of said miniature focusing lenses.

10. An apparatus as claimed in claim 1, wherein said control means comprises:

means for generating first axis data and second axis data respectively representative of a position of the desired position on the workpiece in the first direction and a position of said desired position in the second direction; and means for controlling said scanning means and said driving means in response to the first data and the second data.

* * * * *